(12) United States Patent
Lee et al.

(10) Patent No.: US 12,719,110 B2
(45) Date of Patent: Aug. 25, 2026

(54) TRACTION BATTERY PACK COOLANT RESERVOIR AND COOLANT MANAGEMENT METHOD

(71) Applicant: Ford Global Technologies, LLC, Dearborn, MI (US)

(72) Inventors: Nathan Lee, Novi, MI (US); Mihir Devendra Upadhye, Northville, MI (US); Chulheung Bae, Troy, MI (US); Hassan Farhat, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 631 days.

(21) Appl. No.: 18/332,848

(22) Filed: Jun. 12, 2023

(65) Prior Publication Data

US 2024/0413430 A1 Dec. 12, 2024

(51) Int. Cl.

| | |
|---|---|
| ***H01M 10/6568*** | (2014.01) |
| ***H01M 10/613*** | (2014.01) |
| ***H01M 10/625*** | (2014.01) |
| ***H01M 10/6556*** | (2014.01) |
| ***H01M 50/30*** | (2021.01) |

(52) U.S. Cl.

CPC ..... *H01M 10/6568* (2015.04); *H01M 10/613* (2015.04); *H01M 10/625* (2015.04); *H01M 10/6556* (2015.04); *H01M 50/394* (2021.01); *H01M 2220/20* (2013.01)

(58) Field of Classification Search

CPC ........... H01M 10/6568; H01M 10/613; H01M 10/625; H01M 10/6556; H01M 50/394; H01M 2220/20

USPC .......................................................... 429/120

See application file for complete search history.

(56) References Cited

U.S. PATENT DOCUMENTS

| | | | |
|---|---|---|---|
| 7,433,794 B1 | 10/2008 | Berdichevsky et al. | |
| 10,863,650 B2 | 12/2020 | Shen et al. | |
| 2002/0081467 A1 | 6/2002 | Luft et al. | |
| 2007/0193721 A1 | 8/2007 | Tilton et al. | |
| 2012/0090348 A1* | 4/2012 | O'Rourke .......... | H05K 7/20927 62/434 |
| 2022/0018278 A1* | 1/2022 | Petschenyk ............ | F01P 11/029 |
| 2022/0158268 A1* | 5/2022 | Naruke ............... | H01M 50/204 |
| 2022/0307744 A1* | 9/2022 | Nishioka ............ | B01D 19/0057 |
| 2022/0407167 A1* | 12/2022 | Kellner ............... | H01M 10/613 |
| 2023/0112841 A1 | 4/2023 | Juhasz et al. | |

FOREIGN PATENT DOCUMENTS

JP 2020067082 A * 4/2020

* cited by examiner

*Primary Examiner* — James M Erwin
(74) *Attorney, Agent, or Firm* — David B. Kelley; Carlson, Gaskey & Olds, P.C.

(57) ABSTRACT

A traction battery pack assembly includes a coolant reservoir that receives coolant from a traction battery pack. The coolant reservoir is configured to receive the coolant in a direction that causes the coolant to swirl within the coolant reservoir.

20 Claims, 3 Drawing Sheets

TRACTION BATTERY PACK COOLANT RESERVOIR AND COOLANT MANAGEMENT METHOD

TECHNICAL FIELD

This disclosure relates generally to managing thermal energy and vent byproducts within a traction battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. Coolant can be moved through the traction battery pack to help manage thermal energy within the traction battery pack.

SUMMARY

In some aspects, the techniques described herein relate to a traction battery pack assembly, including: a coolant reservoir that receives coolant from a traction battery pack, the coolant reservoir configured to receive the coolant in a direction that causes the coolant to swirl within the coolant reservoir.

In some aspects, the techniques described herein relate to a traction battery pack assembly, wherein the coolant reservoir is cylindrical.

In some aspects, the techniques described herein relate to a traction battery pack assembly, wherein a sidewall of the coolant reservoir includes an inlet to the coolant reservoir, wherein a vertical bottom of the coolant reservoir includes an outlet from the coolant reservoir.

In some aspects, the techniques described herein relate to a traction battery pack assembly, further including a gas vent of the coolant reservoir.

In some aspects, the techniques described herein relate to a traction battery pack assembly, wherein a sidewall of the coolant reservoir includes an inlet to the coolant reservoir, wherein a vertical bottom of the coolant reservoir includes an outlet from the coolant reservoir, wherein the gas vent is at a vertical top of the coolant reservoir.

In some aspects, the techniques described herein relate to a traction battery pack assembly, wherein the coolant is a liquid coolant.

In some aspects, the techniques described herein relate to a traction battery pack assembly, further including a mesh barrier disposed within an interior of the coolant reservoir, an inlet to the coolant reservoir disposed on a first side of the mesh barrier, a gas vent disposed on an opposite, second side of the mesh barrier.

In some aspects, the techniques described herein relate to a traction battery pack assembly, wherein the coolant reservoir is configured to cause a vortex flow of the coolant.

In some aspects, the techniques described herein relate to a traction battery pack assembly, wherein the coolant reservoir is configured to cause the coolant to swirl about a longitudinal axis of the coolant reservoir.

In some aspects, the techniques described herein relate to a traction battery pack assembly, wherein an interior of the coolant reservoir includes a volume of air.

In some aspects, the techniques described herein relate to a traction battery pack assembly, wherein the coolant reservoir is part of an immersion thermal management system.

In some aspects, the techniques described herein relate to a traction battery pack assembly, further including a traction battery pack and a conduit configured to communicate the coolant from the traction battery pack to the coolant reservoir.

In some aspects, the techniques described herein relate to a traction battery pack assembly, wherein the coolant reservoir is a vapor-liquid separator.

In some aspects, the techniques described herein relate to a method of managing coolant, including: at a coolant reservoir, receiving a coolant from a traction battery pack; within the coolant reservoir, separating air from the coolant; and venting the air from the coolant reservoir.

In some aspects, the techniques described herein relate to a method, further including swirling the coolant within the coolant reservoir.

In some aspects, the techniques described herein relate to a method, further including receiving the coolant from an inlet within a sidewall of the coolant reservoir, and communicating coolant from the coolant reservoir through an outlet at a vertical bottom of the coolant reservoir.

In some aspects, the techniques described herein relate to a method, wherein the coolant reservoir is configured to cause the coolant to swirl about a longitudinal axis of the coolant reservoir.

In some aspects, the techniques described herein relate to a method, further including venting the air through a gas vent at a vertical top of the coolant reservoir.

In some aspects, the techniques described herein relate to a method, further including communicating the air through a mesh barrier within an interior of the coolant reservoir prior to venting the air from the coolant reservoir.

In some aspects, the techniques described herein relate to a method, wherein the coolant reservoir is part of an immersion thermal management system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary coolant reservoirs for a traction battery pack and exemplary methods of managing coolant of a traction battery pack. The coolant reservoir can be part of an immersion thermal management system. In an immersion thermal management system, components of the traction battery, such as battery cells, can be at least partially immersed in the coolant.

As the battery cells are immersed in coolant, vent byproducts vented from the battery cells can be discharged into the liquid coolant creating a mixture of coolant and vent byproducts. The mixture is communicated back to a coolant reservoir.

The example coolant reservoir and coolant management method can facilitate separating the vent byproducts from the mixture so that the liquid coolant, without the gas byproducts, can be circulated back the traction battery pack.

Figure 1:
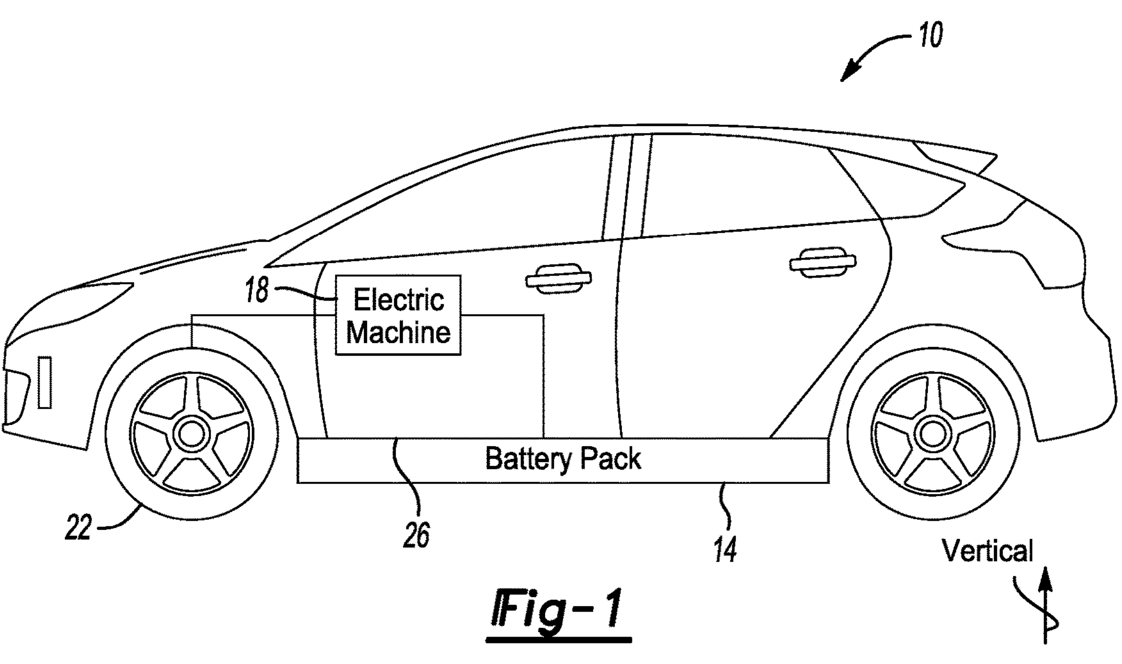
FIG. 1 illustrates a side view of an electrified vehicle having a traction battery pack.

With reference to FIG. 1, an electrified vehicle 10 includes a traction battery pack 14, an electric machine 18, and wheels 22. The traction battery pack 14 powers an electric machine 18, which can convert electrical power to mechanical power to drive the wheels 22. The traction battery pack 14 can be a relatively high-voltage battery.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
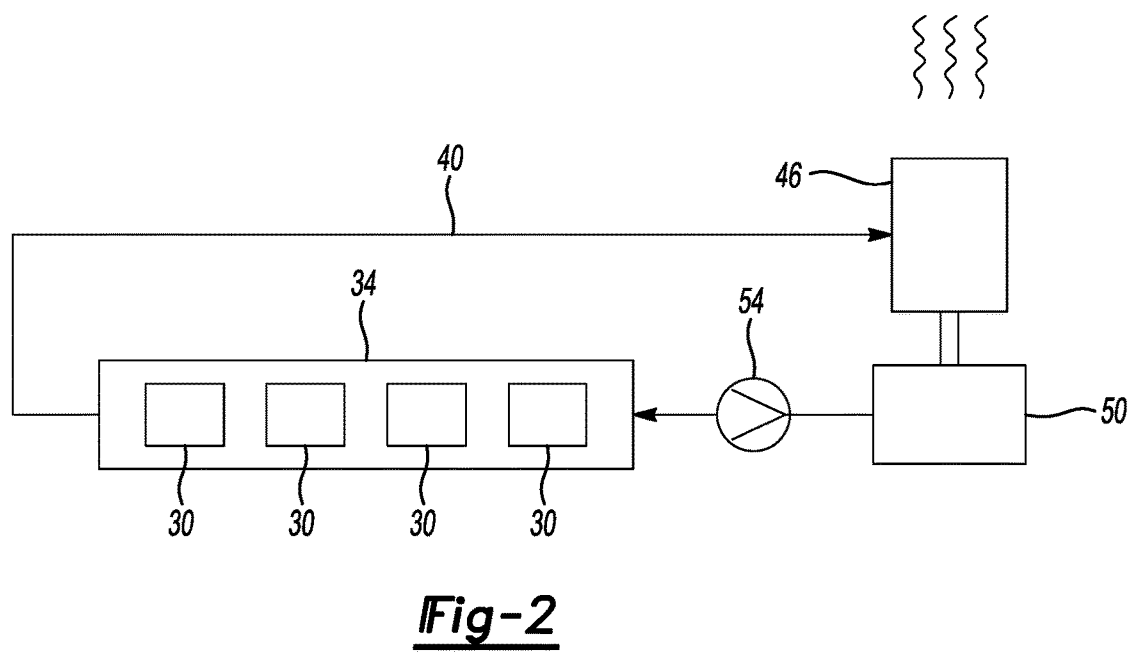
FIG. 2 illustrates a schematic view of an immersion thermal management system used to manage thermal energy levels within the traction battery pack of FIG. 1.

With reference now to FIG. 2, the traction battery pack 14 includes a cell stacks 30 held within an enclosure assembly 34. Each of the cell stacks 30 can include a plurality of individual battery cells.

The plurality of battery cells (or simply, "cells") are for supplying electrical power to various components of the electrified vehicle 10. The battery cells are stacked side-by-side relative to one another to provide the cell stacks 30. In the exemplary embodiment, the enclosure assembly 34 includes an enclosure cover and an enclosure tray. The enclosure cover is secured to the enclosure tray to provide an interior area 38 that houses the cell stacks 30. The traction battery pack 14 includes four cell stacks 30 within the interior area 44 of the enclosure assembly 34.

Although a specific number of cell stacks 30 are illustrated in FIG. 2 of this disclosure, the traction battery pack 14 could include any number of cells and cell stacks 30. In other words, this disclosure is not limited to the specific configuration of cells and cell stacks 30 shown in FIG. 2.

In this example, the battery cells within the cell stacks 30 are prismatic, lithium-ion pouch cells. However, battery cells having other geometries (cylindrical, etc.) and/or chemistries (nickel-metal hydride, lead-acid, etc.) could alternatively be utilized within the scope of this disclosure.

Thermal energy levels within the battery cells and the cell stacks 30 can increase as the vehicle 10 is operated. The example vehicle 10 incorporates a thermal management system to manage thermal energy levels of the battery cells, cell stacks 30, and other areas of the traction battery pack 14. The thermal management system can be used to cool the battery cells of the cell stacks 30. In some examples, the thermal management system could be used to heat the battery cells of the cells stacks 30.

The example thermal management system includes a coolant loop 40 extending from a coolant reservoir 46, through a thermal energy exchange device 50, through a pump 54, through the traction battery pack 14, and then back to the coolant reservoir 46. The coolant loop 40 can include conduits that fluidly couple together the traction battery pack 14, the coolant reservoir 46, the thermal energy exchange device 50, and the pump 54.

The pump 54 can be operated to circulate coolant along the coolant loop 40. The coolant, in this example, fills the enclosure assembly 34 of the traction battery pack 14 to immerse components of the traction battery pack 14 (e.g., the cell stacks 30) within the coolant. Part of the coolant loop 40 is thus provided by the traction battery pack 14.

The example thermal management system is an immersion system. The coolant can take on thermal energy from components that are immersed in the coolant to cool those components. The coolant is a dielectric fluid in this example. The coolant can be an oil.

The coolant flows along the coolant loop 40 from the traction battery pack 14 to the coolant reservoir 46. From the coolant reservoir 46, the coolant flows along the coolant loop 40 to the thermal energy exchange device 50. Thermal energy can be transferred from the coolant at the thermal energy exchange device 50, which can be a liquid-to-liquid heat exchanger or a liquid-to-air heat exchanger.

From the thermal energy exchange device 50, coolant can be moved by the pump 54 back to the traction battery pack 14 to take on more thermal energy from components of the traction battery pack 14.

The example thermal management system can help to manage vent byproducts in addition to manage thermal energy.

For example, one or more of the battery cells within the traction battery pack 14 may, from time to time, experience a thermal event, which can lead to the battery cells venting. The thermal event could result from over-charging conditions, over-discharging conditions, or other conditions.

When venting, the battery cell expels vent byproducts V, which may include gases, effluent particles, and/or other vent byproducts. The battery cells can include a membrane that ruptures in response to a pressure increase within the battery cells. The vent byproducts are expelled through the ruptured vent.

Within the traction battery pack 14, the battery cell are immersed within the coolant. Thus, should one or more of the battery cells vent, the vent byproducts V are expelled into the coolant. The example thermal management system, particularly the coolant reservoir, helps manage these vent byproducts V.

Figure 3:
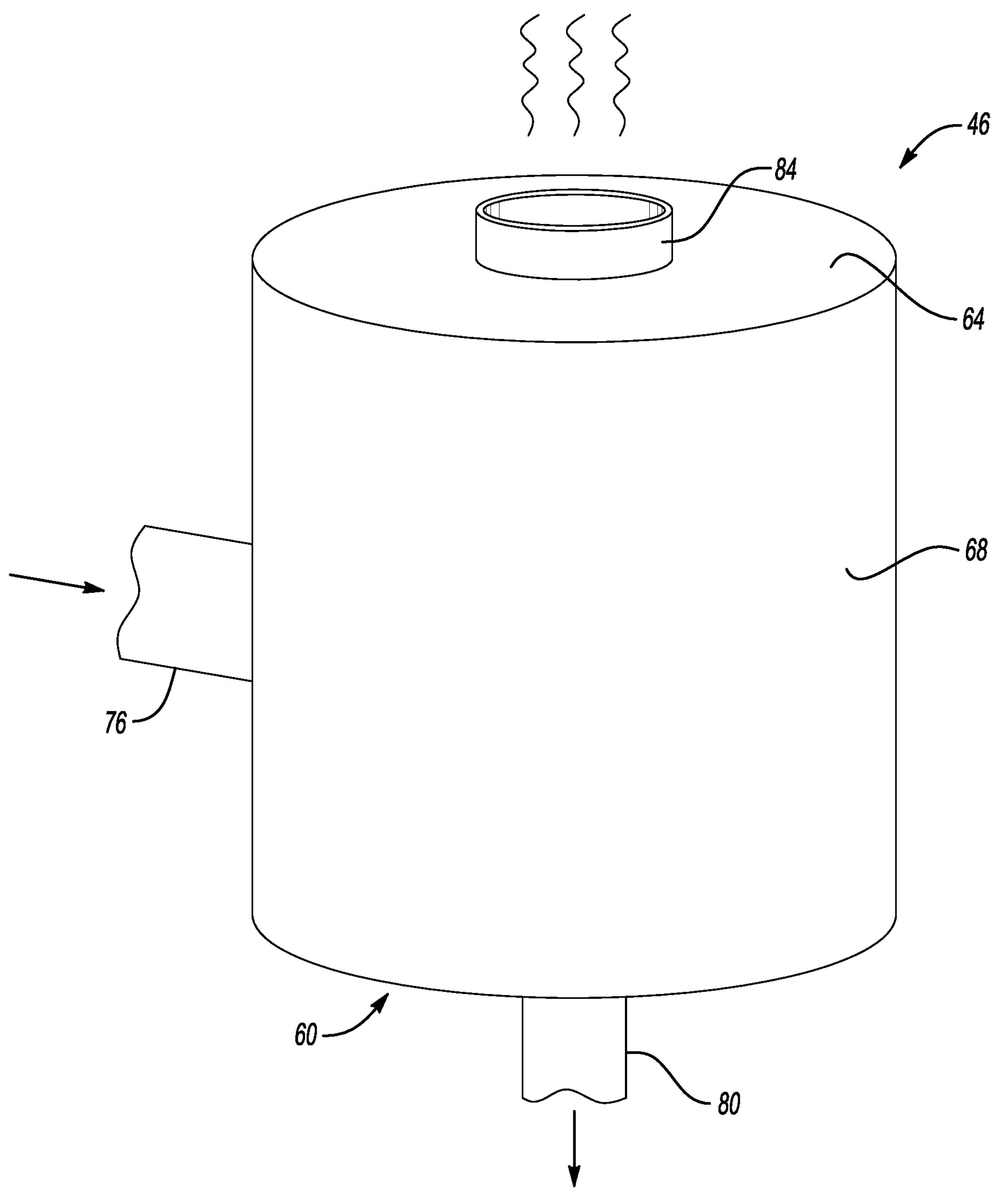
FIG. 3 illustrates a coolant reservoir from the system of FIG. 2 according to an exemplary aspect of the present disclosure
Figure 4:
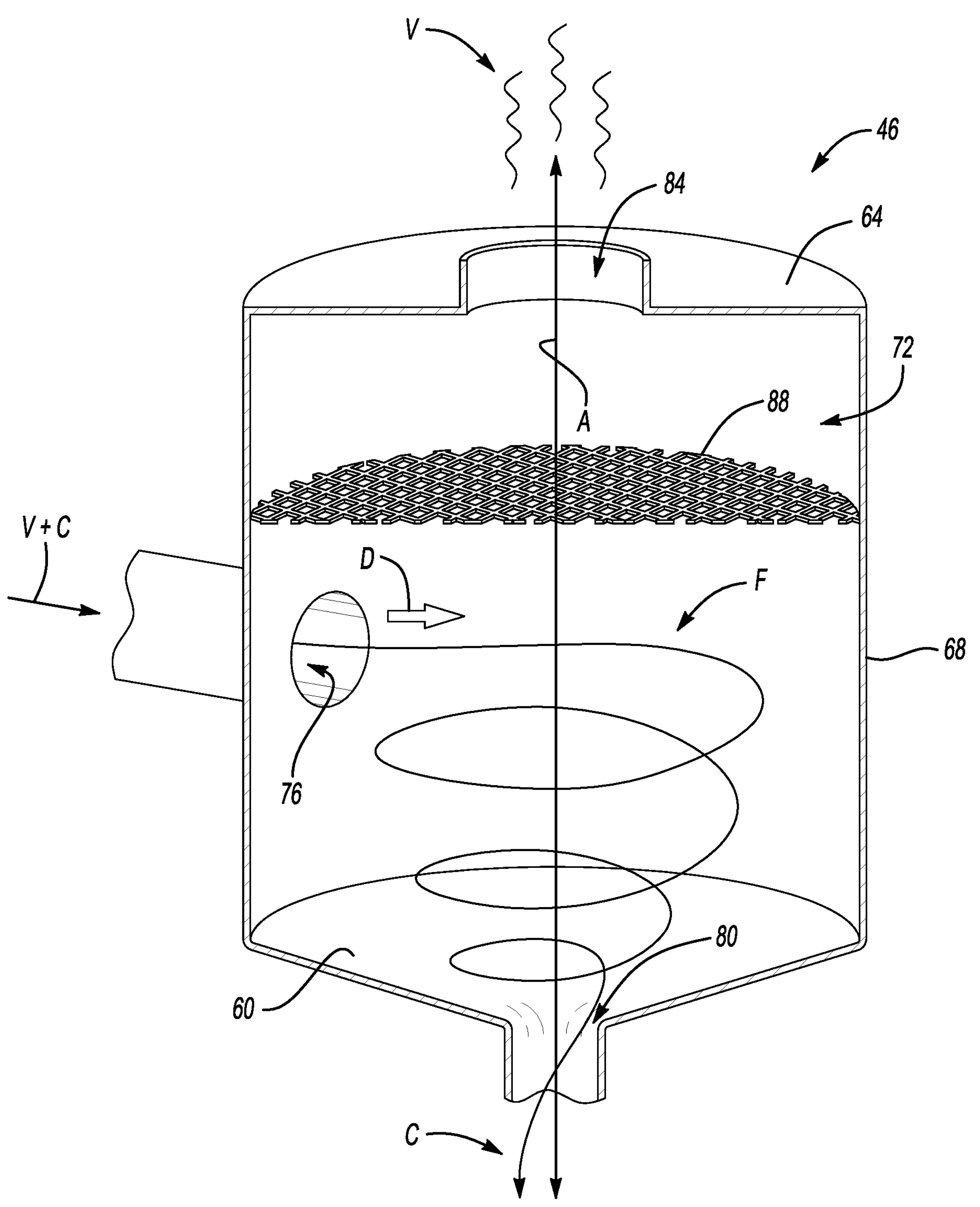
FIG. 4 illustrates a section view of the coolant reservoir of FIG. 3.

With reference to FIGS. 3 and 4 and continuing reference to FIGS. 1 and 2, the coolant reservoir 46, in the exemplary embodiment, is cylindrical and includes a vertical bottom 60, a vertical top 64, and a sidewall 68 extending from the vertical bottom 60 to the vertical top 64. Vertical, for purposes of this disclosure, is with reference to ground and a general orientation of the vehicle 10 during operation.

The coolant reservoir 46 includes an interior area 72. A volume of the interior area 72 is able to contain adequate coolant for operating the immersion system without completely filling the interior area. Some of the interior area thus contains air.

The coolant reservoir 46 includes an inlet 76 within the sidewall 68 and an outlet 80 in the vertical bottom 60. The coolant reservoir 46 additionally includes a gas vent 84 in the vertical top 64 of the coolant reservoir 46.

The inlet 76 guides coolant C into the coolant reservoir 46. The outlet 80 discharges coolant C from the coolant reservoir.

Positioning the inlet 76 in the sidewall 68 can cause the coolant reservoir 46 to receive coolant in a direction D that causes the coolant C to swirl within the coolant reservoir 46.

The inlet 76 is designed to direct the coolant C tangent to a longitudinal axis A of the coolant reservoir 46 to promote the swirling.

The swirling of the coolant C can lead to a vortex flow F of the coolant within the coolant reservoir 46. The coolant experiencing the vortex flow F rotates about the longitudinal axis A when moving downward toward the outlet 80. Positioning the outlet 80 at the longitudinal axis A, which is substantially aligned with axis about which the vortex flow spins, can further facilitate the vortex flow of the coolant C and the discharging of the coolant C from the coolant reservoir 46.

If one or more of the battery cells is venting such that the coolant is mixed with vent byproducts V, and particularly vented gas, a mixture of coolant C and vent byproduct V is introduced to the coolant reservoir 46. The swirling of the coolant C and vent byproducts V mixture within the coolant reservoir 46 can help to separate the vent byproducts V from the coolant. The vent byproducts V can then move vertically upward to the gas vent 84, which expels the vent byproducts V from the coolant reservoir 46. The coolant C, with the vent products V removed, can then pass through the outlet 80. The coolant reservoir 46 can be considered a vapor-liquid separator.

The gas vent 84 can be an opening in the vertical top 64 of the coolant reservoir 46. The gas vent 84 could be a one-way gas vent or pressure equalization valve. In some examples, the gas vent 84 is styled similarly to a radiator cap.

The example coolant reservoir 46 includes a mesh barrier 88 disposed within the interior area 72. The mesh barrier 88 is positioned between the inlet 76 and the gas vent 84. That is, the inlet 76 to the coolant reservoir 46 is disposed on a first side of the mesh barrier 88, and the gas vent 84 disposed on an opposite, second side of the mesh barrier 88.

The mesh barrier 88 can be an oleophilic mesh barrier to attract the coolant and retain splashes of the coolant within the interior area 72 rather than the splashes of coolant exiting the coolant reservoir 46 through the gas vent 84. As configured in this example, vent byproducts V must pass through the mesh barrier 88 prior to exiting the coolant reservoir 46 through the gas vent 84.

Features of the disclosed examples include a coolant reservoir that can accommodate vent byproducts that are vented from battery cells of a traction battery pack.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembly, comprising:

a coolant reservoir that receives coolant from a traction battery pack as part of an immersion thermal management system for the traction battery pack in which one or more battery cells of the traction battery pack are at least partially immersed in the coolant, the coolant reservoir including an inlet configured to direct the coolant tangentially relative to a longitudinal axis of the coolant reservoir to cause the coolant to swirl within the coolant reservoir to separate vent byproducts vented from the one or more battery cells from the coolant.

2. The traction battery pack assembly of claim 1, wherein the coolant reservoir is cylindrical.

3. The traction battery pack assembly of claim 2, wherein a sidewall of the coolant reservoir includes the inlet to the coolant reservoir, wherein a vertical bottom of the coolant reservoir includes an outlet from the coolant reservoir.

4. The traction battery pack assembly of claim 1, further comprising a gas vent of the coolant reservoir.

5. The traction battery pack assembly of claim 4, wherein a sidewall of the coolant reservoir includes the inlet to the coolant reservoir, wherein a vertical bottom of the coolant reservoir includes an outlet from the coolant reservoir, wherein the gas vent is at a vertical top of the coolant reservoir.

6. The traction battery pack assembly of claim 1, further comprising an oleophilic mesh barrier disposed within an interior of the coolant reservoir and configured to retain splashes of the coolant within the interior of the coolant reservoir, the inlet to the coolant reservoir disposed on a first side of the oleophilic mesh barrier, a gas vent disposed on an opposite, second side of the oleophilic mesh barrier.

7. The traction battery pack assembly of claim 1, wherein an interior of the coolant reservoir includes a volume of air.

8. The traction battery pack assembly of claim 1, further comprising the traction battery pack and a conduit configured to communicate the coolant from the traction battery pack to the coolant reservoir.

9. A method of managing coolant in an immersion thermal management system in which battery cells of a battery pack are at least partially immersed in the coolant, the method comprising:

at a coolant reservoir, receiving a coolant from the battery pack;

within the coolant reservoir, directing the coolant tangentially relative to a longitudinal axis of the coolant reservoir to swirl the coolant and separate vent byproducts vented from the battery cells from the coolant; and venting the vent byproducts from the coolant reservoir.

10. The method of claim 9, further comprising receiving the coolant from an inlet within a sidewall of the coolant reservoir, and communicating coolant from the coolant reservoir through an outlet at a vertical bottom of the coolant reservoir.

11. The method of claim 9, further comprising venting the vent byproducts through a gas vent at a vertical top of the coolant reservoir.

12. The method of claim 11, further comprising communicating the vent byproducts through a mesh barrier within an interior of the coolant reservoir prior to venting the vent byproducts from the coolant reservoir.

13. The traction battery pack assembly of claim 1, wherein the inlet is oriented tangentially to an inner surface of the coolant reservoir such that the coolant enters the coolant reservoir in a direction substantially perpendicular to the longitudinal axis.

14. The traction battery pack assembly of claim 1, wherein the vent byproducts include vented gas from the one or more battery cells.

15. The traction battery pack assembly of claim 1, wherein an outlet of the coolant reservoir is positioned at the longitudinal axis of the coolant reservoir such that the outlet is substantially aligned with an axis about which the coolant swirls.

16. A battery pack assembly, comprising:

a battery pack including one or more battery cells; and a coolant reservoir fluidly coupled to the battery pack and configured to receive coolant from the battery pack, the coolant reservoir including a cylindrical body having a sidewall, a vertical top, and a vertical bottom, an inlet in the sidewall configured to direct the coolant tangentially relative to a longitudinal axis of the cylindrical body to generate a vortex flow of the coolant within the coolant reservoir, an outlet in the vertical bottom, and a gas vent in the vertical top, wherein the vortex flow separates vent byproducts vented from the one or more battery cells from the coolant, and the gas vent expels the vent byproducts from the coolant reservoir.

17. The battery pack assembly of claim 16, wherein the inlet is oriented tangentially to an inner surface of the coolant reservoir such that the coolant enters the coolant reservoir in a direction substantially perpendicular to the longitudinal axis.

18. The battery pack assembly of claim 16, wherein an outlet of the coolant reservoir is positioned at the longitudinal axis of the coolant reservoir such that the outlet is substantially aligned with an axis about which the coolant swirls.

19. The traction battery pack assembly of claim 1, wherein the coolant is a dielectric fluid.

20. The method of claim 9, wherein the vent byproducts include vented gas expelled from one or more battery cells of the battery pack during a thermal event.

* * * * *